United States Patent [19]

Taga et al.

[11] Patent Number: 5,347,885

[45] Date of Patent: Sep. 20, 1994

[54] SHIFT CONTROL SYSTEM FOR SELECTING BETWEEN TWO SHIFT PATTERNS BASED ON THE TRANSMISSION TEMPERATURE AND LOCK-UP CLUTCH STATE IN AN AUTOMATIC TRANSMISSION

[75] Inventors: Yutaka Taga, Aichi; Yasuo Hojo, Nagoya; Atsushi Tabata, Okazaki, all of Japan

[73] Assignee: Toyota Jidosha Kabushiki Kaisha, Toyota, Japan

[21] Appl. No.: 889,287

[22] Filed: May 28, 1992

[30] Foreign Application Priority Data

May 28, 1991 [JP] Japan .................................. 3-152382

[51] Int. Cl.$^5$ ...................... F16H 61/02; F16H 61/14
[52] U.S. Cl. .................... 477/65; 364/424.1; 477/75; 477/76
[58] Field of Search ............... 74/844, 856, 878, 732.1, 74/733.1, 866; 364/424.1; 192/3.3, 3.31

[56] References Cited

U.S. PATENT DOCUMENTS

| | | | |
|---|---|---|---|
| 4,449,618 | 5/1984 | Suga et al. | 74/866 X |
| 4,509,124 | 4/1985 | Suzuki et al. | 74/866 X |
| 4,733,581 | 3/1988 | Hasegawa et al. | 74/866 X |
| 4,817,473 | 4/1989 | Baltusis et al. | 74/844 X |
| 5,050,717 | 9/1991 | Shibayama | 192/3.31 X |
| 5,069,084 | 12/1991 | Matsuno et al. | 74/844 |
| 5,133,232 | 7/1992 | Kikuchi et al. | 74/866 X |
| 5,157,991 | 10/1992 | Sumimoto | 74/844 X |
| 5,191,814 | 3/1993 | Ando et al. | 74/866 |

FOREIGN PATENT DOCUMENTS 57-33253 2/1982 Japan .
60-151457 8/1985 Japan .

*Primary Examiner*—Leslie A. Braun
*Assistant Examiner*—Khoi Ta
*Attorney, Agent, or Firm*—Oblon, Spivak, McClelland, Maier & Neustadt

[57] ABSTRACT

A shift control system controls an automatic transmission of a vehicle wherein half-lock-up control for a lock-up clutch is executed when the running state of the vehicle is in a predetermined operative range. The shift control system includes a half-lock-up control inhibiting unit for inhibiting the half-lock-up control from being executed when the running state of the vehicle is held in a specific operative state even though the running state of the vehicle is in the predetermined range, a determining unit for determining whether or not the half-lock-up control is inhibited by the half-lock-up control inhibiting means, and a controlling unit for controlling the automatic transmission such that a low speed stage at which the half-lock-up control is easily executed is positively utilized when it is determined that the half-lock-up control is not inhibited by the determining unit, and moreover, controlling shift change of the automatic transmission such that a high speed stage having a gear ratio lower than that at the lower speed stage is positively utilized when it is determined that the half-lock-up control is inhibited by the determining unit.

5 Claims, 7 Drawing Sheets

SHIFT PATTERN A

FIG. 3

| SHIFT POSITION | | $C_1$ | $C_2$ | $C_0$ | $B_1$ | $B_2$ | $B_3$ | $B_0$ | $F_1$ | $F_2$ | $F_0$ |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | | | | ○ | | | ◎ | |
| D | 3 | ○ | | ○ | | ○ | | | ◎ | | ◎ |
| D | 4 | ○ | ○ | ○ | | ○ | | | | | ◎ |
| D | 5 | ○ | ○ | | | ○ | | ○ | | | |
| 2 | 1 | ○ | | ○ | | | | | | ◎ | ◎ |
| 2 | 2 | ○ | | | | | ○ | ○ | | ◎ | |
| 2 | 3 | ○ | | ○ | ○ | ○ | | | ◎ | | ◎ |
| L | 1 | ○ | | ○ | | | ○ | | | ◎ | ◎ |
| L | 2 | ○ | | | | | ○ | ○ | | ◎ | |

◎ : ENGAGEMENT AT ENGINE DRIVING

SHIFT CONTROL SYSTEM FOR SELECTING BETWEEN TWO SHIFT PATTERNS BASED ON THE TRANSMISSION TEMPERATURE AND LOCK-UP CLUTCH STATE IN AN AUTOMATIC TRANSMISSION

BACKGROUND OF THE INVENTION

The present invention relates generally to a shift control system for an automatic transmission of a vehicle. More particularly, the present invention relates to a shift control system for controlling a lock-up clutch of a torque converter.

As is well known, a torque converter for an automatic transmission includes a lock-up clutch by way of which an input member is connected to an output member of the torque converter. The operative state that torque is transmitted with some slippage of the lock-up clutch is here referred to as a half-lock-up state. Thus, it is preferable to control slippage of the lock-up clutch not only for preventing uncomfortable vibration and noise but also for improving fuel economy. A feedback control system for executing half-lock-up control of the lock-up clutch is described in Japanese Patent Publication NO. 63-13060. According to this prior invention, an engaging force for engaging the lock-up clutch is controlled to set in a proper value corresponding to the difference between a pump speed (i.e., an engine speed) and a turbine speed.

The lock-up clutch arranged in the torque converter of the automatic transmission is generally engaged by oil pressure. Thus, in the feedback control system as disclosed in Japanese Patent Publication NO. 63-13060, the oil pressure applied to the lock-up clutch is controlled by feedback control so as to maintain slippage of the lock-up clutch in a predetermined target value. In FIG. 7, a half-lock-up range is shown in a shift pattern diagram.

In the above-mentioned feedback control system, excessive slippage is prevented so that t he fuel economy does not fall and durability of a friction element does not deteriorate. In addition, a quantity of slippage of the lock-up clutch does not excessively small so that booming noise and vibration due to fluctuation of an engine torque are prevented.

Therefore, the aforementioned advantages can be obtained by executing half-lock-up control for the lock-up clutch. However, the half-lock-up control for the lock-up clutch is not always executed regardless of the present running state of the vehicle. In practice, the half-lock-up control for the lock-up clutch is inhibited by various kinds of conditions of the vehicle.

For example, when the present engine speed is lower than a predetermined value, vibration is liable to arise. At this time, the half-lock control for the lock-up clutch is inhibited. Also in case that a temperature of an oil in the automatic transmission is high, since the oil temperature is additionally elevated due to slippage of the lock-up clutch, the half-lock-up control for the lock-up clutch is also inhibited. In addition, in case that warming-up of an engine is not still completed or in case that data (a rotational speed of the pump, a rotational speed of the turbine or the like) required for execution of the half-lock-up control for the lock-up clutch are not obtainable due to failure of sensors, the half-lock-up control for the lock-up clutch is likewise inhibited.

Among many inhibitive conditions as mentioned above, there is included a condition that the half-lock-up control for the lock-up clutch is inhibited due to reduction of an engine speed in excess of a predetermined value. Generally, while a vehicle runs at a high speed using a higher speed stage such as an overdrive stage, there arises a case that the half-lock-up control for the lock-up clutch is inhibited due to reduction of an engine speed.

There is a general tendency that fuel economy is improved when the vehicle runs with reduction of an engine speed while a speed stage is set to a higher one. In case that the half-lock-up control for the lock-up clutch is inhibited due to a low engine speed, it is recommendable to execute the half-lock-up control for the lock-up clutch by shifting to a lower speed stage in order to improve fuel economy.

However, as far as the conventional automatic transmission is concerned, a shift stage is determined in consideration of an engine speed, a vehicle speed or the like but it is not determined dependent on whether half-lock-up control for the lock-up control can be executed or not. Lately, there is tendency that a total gear ratio of the vehicle is elevated to a higher one, causing an engine speed at a higher speed stage to be reduced. For this reason, with the conventional automatic transmission, there are many cases that half-lock-up control for the lock-up clutch is inhibited during running of the vehicle with a higher speed stage. In other words, there are many cases that the vehicle runs with a higher speed stage while the lock-up clutch is released from the engaged state. As a result, there arises a problem that fuel economy is deteriorated.

SUMMARY OF THE INVENTION

An object of the present invention is to provide a shift control system for an automatic transmission of a vehicle wherein fuel economy of the vehicle including a lock-up clutch can be improved substantially.

Another object of the present invention is to provide a shift control system for an automatic transmission of a vehicle wherein a shift stage is determined dependent on whether half-lock-up control for the lock-up clutch can be executed or not, so as to improve fuel economy of the vehicle.

Further object of the present invention is to provide a shift control system for an automatic transmission of a vehicle wherein in case that half-lock-up control for the lock-up clutch can not be executed, the vehicle is caused to positively run at a higher speed stage, and in case that half-lock-up control for the same can be executed, the vehicle is caused to positively run at a lower speed stage rather than the higher speed stage, so as to improve fuel economy of the vehicle.

According to the present invention, there is provided a shift control system for an automatic transmission of a vehicle wherein half-lock-up control for a lock-up clutch is executed when the running state of the vehicle is in a predetermined position, wherein the shift control system comprises half-lock-up control inhibiting means for inhibiting the half-lock-up control from being executed when the running state of the vehicle is held in a specific operative state even though the running state of the vehicle is in the predetermined range, determining means for determining whether or not the half-lock-up control is inhibited by the half-lock-up control inhibiting means, and controlling means for controlling the automatic transmission such that a low speed at which the half-lock-up control can easily be executed is positively utilized when it is determined that the half-lock-up control is not inhibited by the determining means, and moreover, controlling shift change of the automatic transmission such that a high speed stage having a gear ratio lower than that at the low speed stage is positively utilized when it is determined that the half-lock-up control is inhibited by the determining means.

The shift control system can determine based on a temperature of an oil in the automatic transmission whether the half-lock-up control for the lock-up clutch is inhibited or not. Alternatively, the shift control system may made the foregoing determination dependent on whether judder occurs with the lock-up clutch or not.

With respect to the automatic transmission which can set a fifth forward speed stage, in case that the half-lock-up control for the lock-up clutch is inhibited, shift control is executed in such a manner as to positively utilize a fifth forward speed stage. On the contrary, in case that the half-lock-up control for the lock-up clutch is allowed, shift control is executed in such a manner as to positively utilize a fourth forward speed stage at which the half-lock-up control for the lock-up clutch can be executed.

The above and further objects and novel features of the invention will more fully appear from the following detailed description when the same is read in connection with the following drawings. It is to be expressly understood, however, that the drawings are for purpose of illustration only and is not intended as a definition of the limit of the invention.

BRIEF DESCRIPTION OF THE DRAWINGS

FIG. 3 is a diagram which illustrates the operative state that frictional engaging units in the automatic transmission are engaged and released from the engaged state.

DESCRIPTION OF THE PREFERRED EMBODIMENTS

Figure 1:
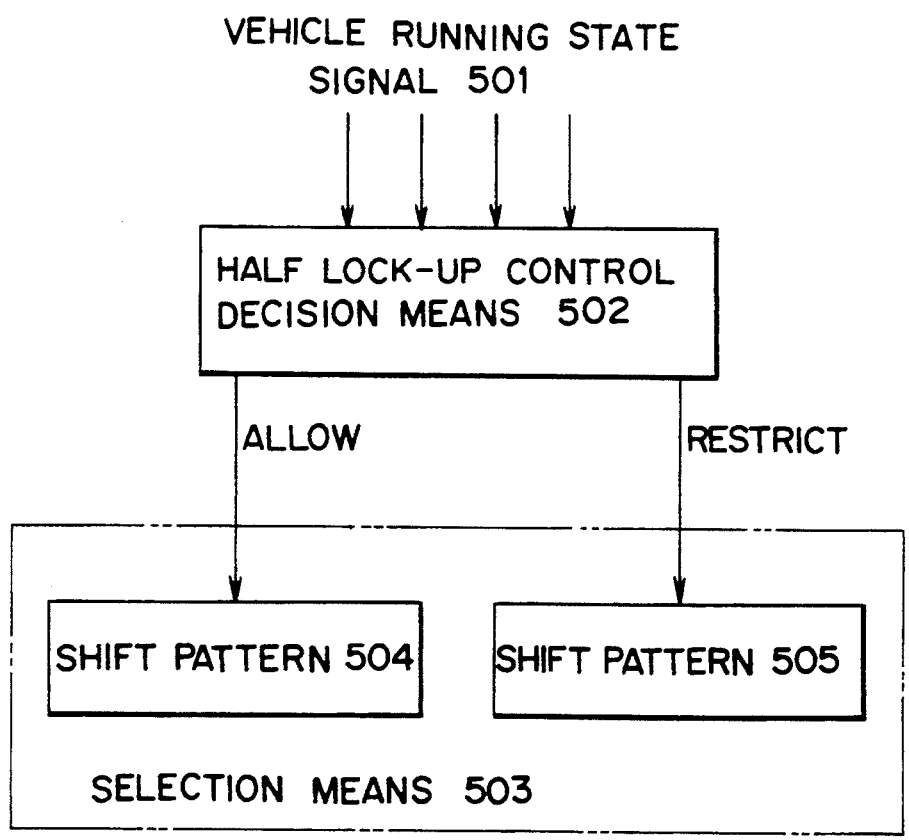
FIG. 1 is a block diagram which schematically illustrates the structure of a shift control system for an automatic transmission of a vehicle in accordance with the present invention.

To facilitate understanding of the present invention, the structure of a shift control system for an automatic transmission of a vehicle in accordance with the present invention will briefly be described below with reference to FIG. 1.

In response to a variety of vehicle running state signals 501 each representing the present running state of the vehicle, half-lock-up control determining means 502 for determining whether or not execution of half-lock-up control is inhibited for a lock-up clutch is activated. Specifically, when the running state of the vehicle is held at a specific operative state even though the running state of the same is in the half-lock-up range, execution of the half-lock-up control is inhibited, and then, the half-lock-up control decision means 502 determines that execution of the half-lock-up control has been inhibited. In addition, the system includes selection means 503 operatively associated with the half-lock-up control decision means 502 for selectively setting a speed stage based on the results derived from the determination made by the half-lock-up control means 502. The selection means 503 is selectively activated in accordance with either of two shift patterns 504 and 505, one of them being a shift pattern 504 employable for positively utilizing a lower speed stage as far as possible at which the half-lock-up control for the lock-up clutch can easily be executed and the other one being a shift pattern 5 05 employable for positively utilizing a higher speed stage as far as possible so as to improve fuel economy. Thus, when the half-lock-up control is not inhibited, the automatic transmission is controlled such that a low speed stage at which the half-lock-up control can easily be executed. On the contrary, when the half-lock-up control is inhibited, the automatic transmission is controlled such that a high speed stage having a gear ratio lower than that at the low speed stage is positively utilized.

Now, the present invention will be described in more detail hereinafter with reference to FIG. 2 to FIG. 8 which illustrate preferred embodiments of the present invention.

Figure 2:
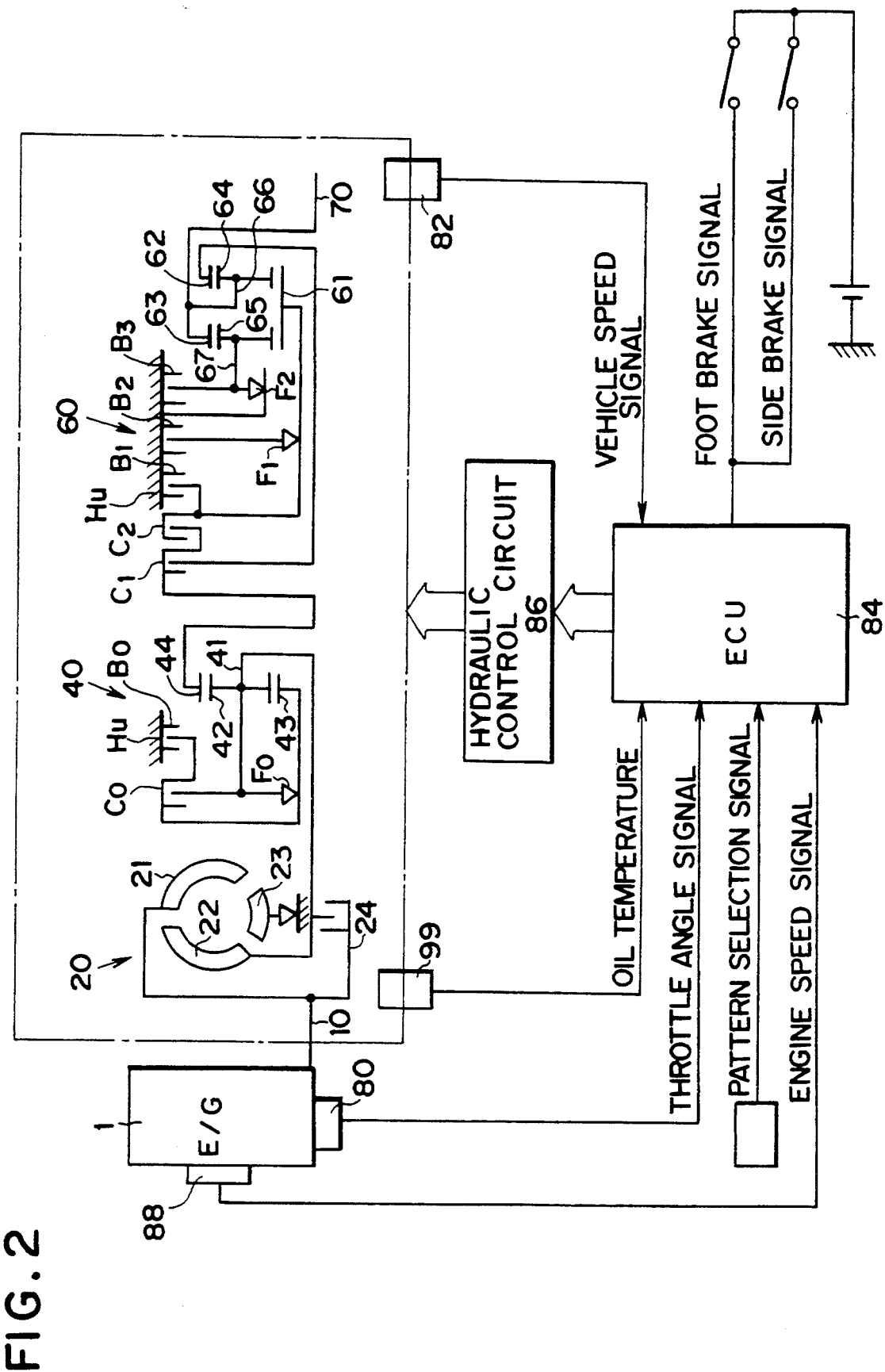
FIG. 2 is an illustrative view of the apparatus, particularly showing the whole structure of the automatic transmission to which the present invention is applied.

FIG. 2 is an illustrative view which schematically shows the structure of an automatic transmission for a vehicle to which the present invention is applied.

The automatic transmission includes a torque converter 20, an overdrive mechanism 40 and an underdrive mechanism 60 having four speed stages, i.e. , three forward speed stages and a single rearward speed stage.

The torque converter 20 comprises a pump 21, a turbine 22, a stator 23 and a lock-up clutch 24 in the conventional manner so that an output from a crankshaft 10 of an engine 1 is transmitted to the overdrive mechanism 40 via the torque converter 20.

The lock-up clutch 24 is actuated by a circuit system to be described later when the present operative state of the torque converter 20 coincides with given operative conditions, whereby the pump 21 is hydraulically connected to the turbine 22 (accompanied by a predetermined quantity of slippage).

The overdrive mechanism 40 includes a planetary gear unit having of a sun gear 43, a ring gear 44, a planetary pinion 42 and a carrier 41, and the rotational operative state of the planetary gear unit is controlled by a clutch C0, a brake B0 and an one-way clutch F0.

The underdrive mechanism 60 includes two planetary gear units operatively integrated with each other. Specifically, the planetary gear units are composed of a common sun gear 61, ring gears 62 and 63, planetary pinions 64 and 65 and carriers 66 and 67, and the rotational operative state of the two planetary gear units and the operatively connected state of the same relative to the overdrive mechanism 40 are controlled by clutches C1 and C2, brakes B1 to B3 and one-way clutches F1 and F2.

Since a typical structure of a power transmission system in the automatic transmission is well known for any expert in the art, FIG. 2 illustrates merely by way of a skeleton diagram the structure of a power transmission system. For this reason, detailed description on the structure of the power transmission system is neglected for the purpose of simplification.

Thus, the automatic transmission includes a power transmission system as mentioned above and a computer 84. A variety of control signals are inputted into the computer 84 from a throttle sensor 80 for detecting a throttle angle $\theta$ to indicate the present loaded state of an engine 1, a vehicle speed sensor 82 (i.e., rotational speed sensor for detecting a rotational speed of an output shaft 70) for detecting a vehicle speed V and a temperature sensor 99 for detecting a temperature H of oil in the automatic transmission. In addition, a signal representing an engine speed is input ted into the computer 84 from an engine speed sensor 88.

The computer 84 controllably actuates a solenoid valve in a hydraulic control circuit 86 in accordance with a stored shift pattern diagram representing the relationship between the throttle angle $\theta$ and the vehicle speed V which has been selected based on a flowchart to be described later. Thus, the computer 84 executes specific speed change based on a combination derived from operative engagement among clutches, brakes or the like as shown in FIG. 3.

Figure 4:
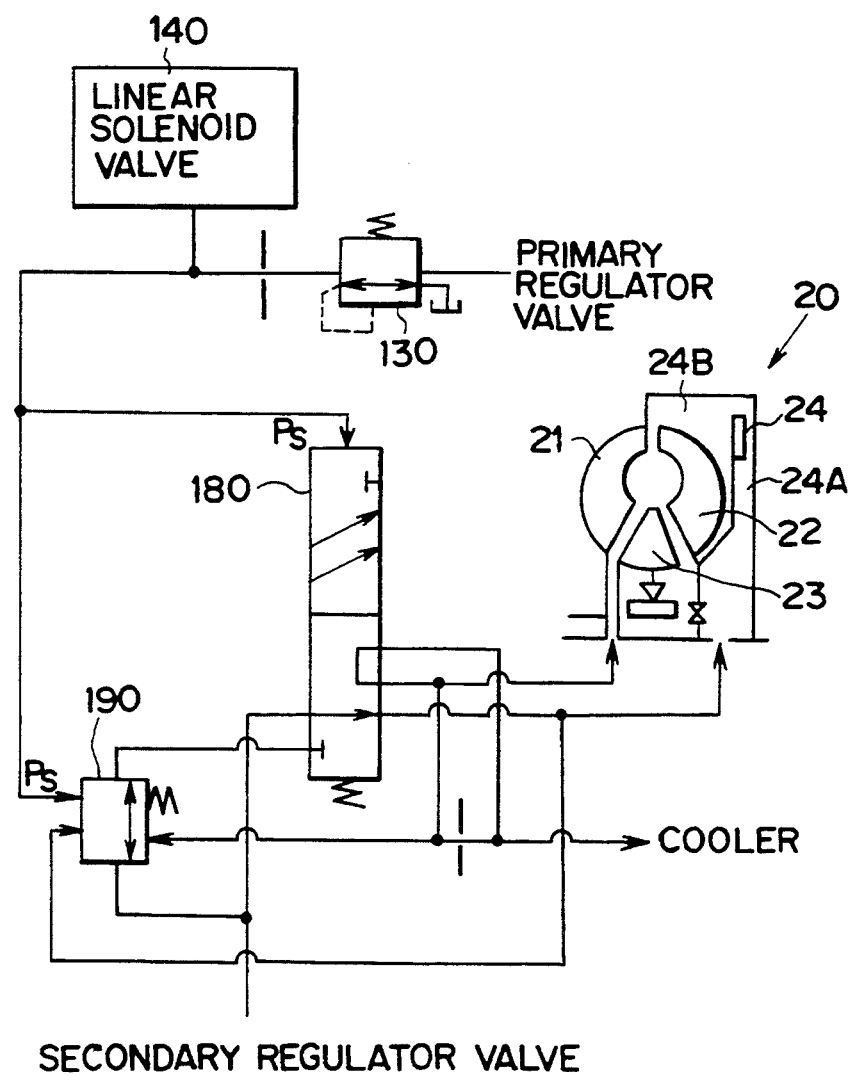
FIG. 4 is a circuit diagram which schematically illustrates arrangement of hydraulic circuits for engaging a lock-up clutch and releasing it from the engaged state.

FIG. 4 is an illustrative view which shows a circuit system for engaging the lock-up clutch.

In the drawing, reference numeral 180 designates a lock-up relay valve and reference numeral 190 designates a lock-up control valve. A conventional structure ( as disclosed in Japanese Patent Laid-Open NO 2-80857) can unchangeably be employed for constituting a hardware system for engaging the lock-up clutch 24 in cooperation with a solenoid modulator valve 130, a linear solenoid valve 140, the lock-up relay valve 180 and the lock-up control valve 190.

For the convenience o f understanding of the present invention, the foregoing hardware system will briefly be described below. Specifically, the lock-up relay valve 180 serves as a valve for changing a locked state of the lock-up clutch 24 to an unlocked state of the same and vice versa. Each shifting operation is performed based on the determination as to whether a control hydraulic pressure Ps generated by the linear solenoid valve 140 exceeds a certain threshold level or not.

The lock-up clutch 24 can smoothly be engaged (accompanied by transitional slippage) or released from the engaged state in cooperation with the lock-up control valve 190 by gradually increasing or decreasing the control hydraulic pressure Ps at the time of each shifting operation with the aid of the linear solenoid valve 140.

On the other hand, the lock-up control valve 190 serves as a control valve for properly controlling the engagement pressure (i.e., the differential pressure between a hydraulic pressure in a hydraulic chamber 24A and a hydraulic pressure in a hydraulic chamber 24B) appearing when the lock-up clutch 24 is engaged so as to allow a quantity of slippage of the lock-up clutch 24 to assume a predetermined target value. It should be added that the control hydraulic pressure Ps generated by the linear solenoid valve 140 is utilized as a control pilot pressure at that time. As is apparent from the above description, the lock-up clutch 24 can be engaged (accompanied by certain slippage) with a necessary and sufficient intensity of hydraulic pressure corresponding to the present output torque derived from the engine 1 by properly controlling the control hydraulic pressure Ps.

Figure 5:
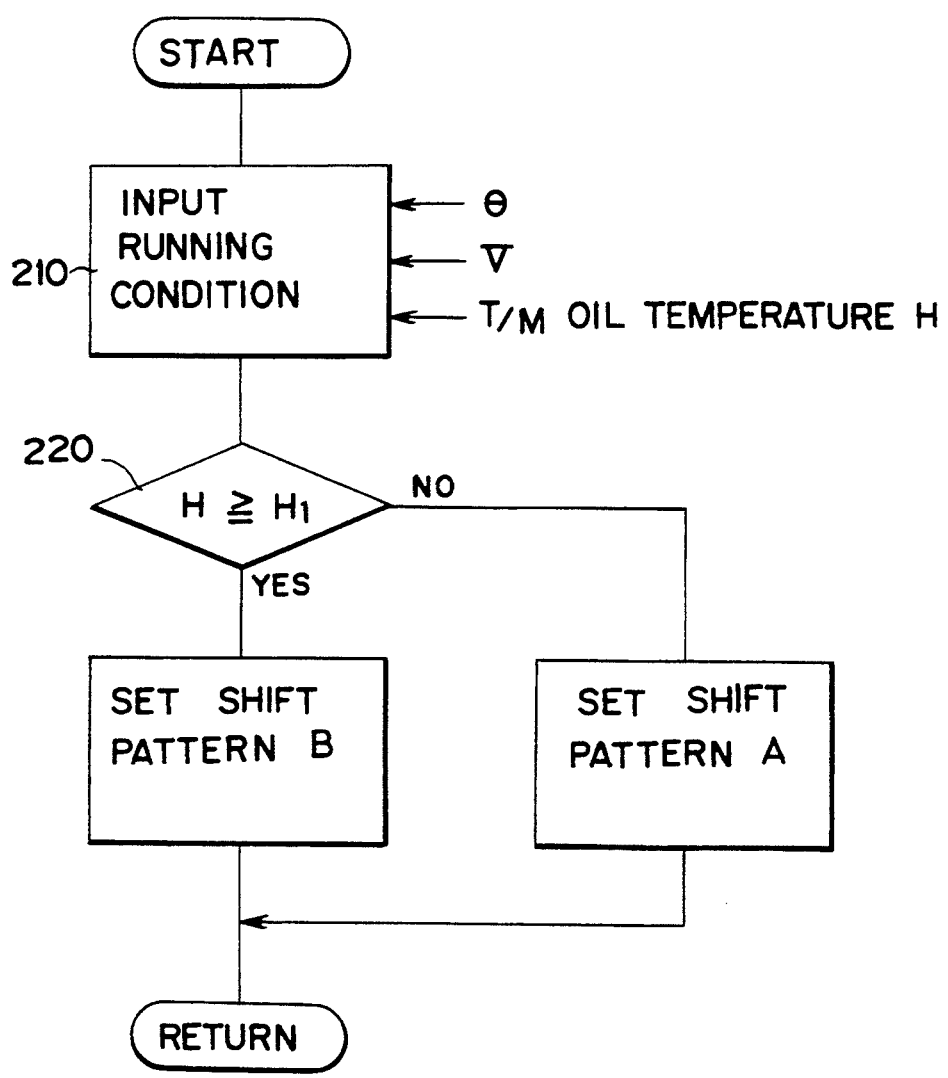
FIG. 5 is a flowchart which illustrates a series of steps to be executed for the shift control system in accordance with a first embodiment of the present invention.

A series of steps to be executed by a shift control system for an automatic transmission of a vehicle in accordance with a first embodiment of the present invention will be described below with reference to a flowchart shown in FIG. 5.

After start of the program, first, an electronic controlling unit (hereinafter referred to simple as an ECU) 84 reads information transmitted from various kinds of sensors for detecting the running state of the vehicle. For example, the ECU 84 reads a throttle angle $\theta$, the vehicle speed V and the temperature H of oil in the automatic transmission. Then, the program goes to a step 220 at which the ECU 84 determines whether the temperature H of the oil in the automatic transmission is higher than a predetermined value H1 or not. Specifically, at the step 220, the ECU 84 intends to determine whether or not the automatic transmission is in the operative range that half-lock-up control for the lock-up clutch can be allowed. When the temperature H of the oil in the automatic transmission is higher than the predetermined value H1, the ECU 84 determines that the automatic transmission is in the operative range that half-lock-up control for the lock-up clutch can be allowed. For this reason, the ECU 84 selects a shift pattern B shown in FIG. 8 wherein the half-lock-up control for the lock-up clutch can positively be executed, i.e., the range covering a fourth forward speed stage can be widened for the vehicle. Subsequently, the ECU 84 determines a speed stage based on the shift pattern B, and moreover, it controls the lock-up clutch 2 4 in accordance with the shift pattern B.

Since execution of half-lock-up control for the lock-up clutch becomes a problem only when the throttle valve is kept open with a small angle, the ECU 82 does not widen the range covering a fourth forward speed stage, especially when the vehicle runs while the throttle valve is kept open with a large angle.

On the other hand, when the ECU 84 has determined that the temperature H of the oil in the automatic transmission is lower than the predetermined value H1, the ECU 84 inhibits execution of the half-lock-up control for the lock-up clutch. At this time, to improve fuel economy, the ECU 84 narrows the range covering a fourth forward speed stage. Alternatively, the ECU 84 may select a shift pattern A shown in FIG. 8 wherein the range including a fifth forward speed stage is widened. In this case, the ECU 84 determines a speed stage based on the shift pattern A, and moreover, it controls the lock-up clutch 24 in accordance with the shift pattern A.

In other words, when the automatic transmission is in the operative range that the half-lock-up control for the lock-up clutch is inhibited, it is preferable that the ECU 84 widens the range covering a fifth forward speed stage at the step 220. This is because excellent fuel economy can be obtained when the vehicle runs at a higher speed stage at each time when a speed stage is changed as long as the half-lock-up control for the lock-up clutch is inhibited.

On the other hand, when the ECU 84 determines at the step 220 that the automatic transmission is in the operative range that the half-lock-up control for the lock-up clutch can be allowed, it is preferable that the ECU 84 widens the range covering a fourth forward speed stage. This is because the engine speed tends to be lowered at the fifth forward speed stage since a total gear ratio is lately set to a higher gear ratio. Therefore, it is obvious that each vehicle assumes the operative range that improved fuel economy can be obtained when the vehicle runs at a fourth forward speed stage with execution of half-lock-up control for the lock-up clutch rather than when the vehicle runs at a fifth forward speed stage without any execution of half-lock-up control for the lock-up clutch.

Next, a shift control system for an automatic transmission of a vehicle in accordance with a second embodiment of the present invention will be described below with reference to FIG. 6

Figure 6:
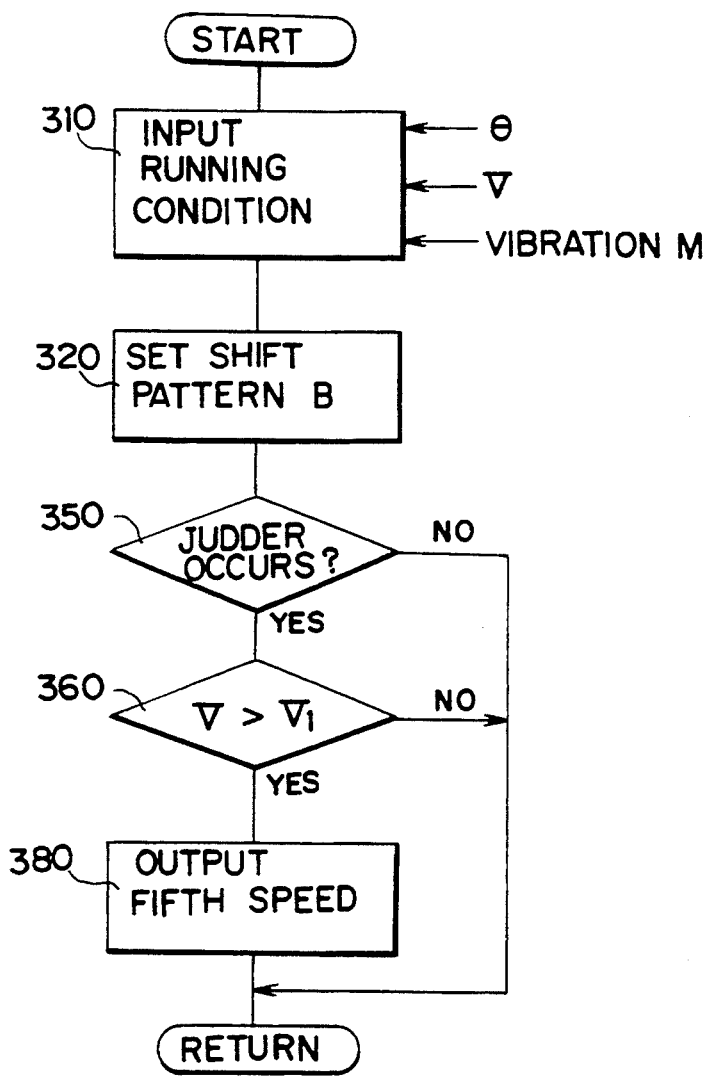
FIG. 6 is a flowchart which illustrates a series of steps to be executed for the shift control system in accordance with a second embodiment of the present invention.
Figure 7:
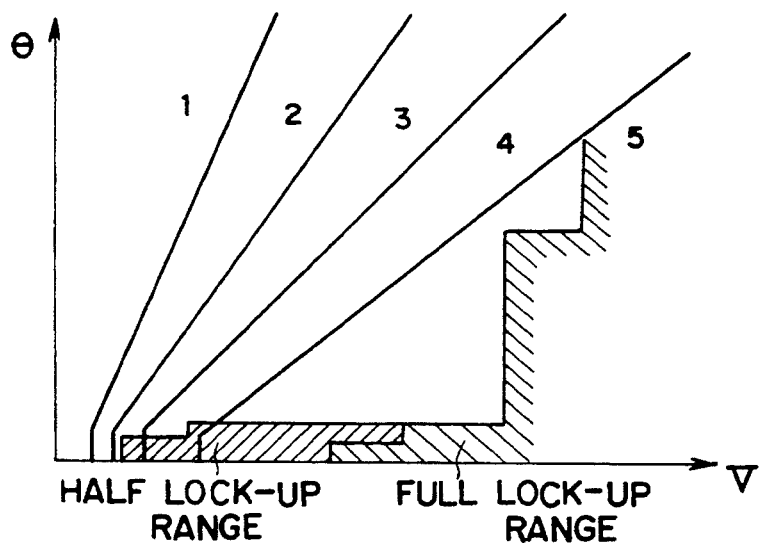
FIG. 7 is a diagram which illustrates a speed changing pattern which is generally used for changing a speed of the automatic transmission.

FIG. 6 is a flowchart which illustrates a series o f steps to be executed by the ECU 84. After start of the program, first, the ECU 84 reads informations at a step 310 which are transmitted from various kinds of sensors for detecting the present running state of the vehicle.

In this embodiment, information representing a vibration state M of the vehicle is inputted into the ECU 84 from a vibration detector (not shown). Then, the program goes to a step 320 at which the shift pattern B shown in FIG. 8, i.e., a shift pattern wherein the range covering a fourth forward speed stage is widened (a shift pattern to be selected when execution of half-lock-up control for the lock-up clutch can be allowed) is selected. At this time, the ECU 84 determines a speed stage in accordance with the shift pattern B.

Then, the program goes to a step 350 at which the ECU 84 determines whether judder occurs or not. When no judder occurs, the ECU 84 determines at the step 350 that the automatic transmission is in the operative range that half-lock-up control for the lock-up clutch can be allowed. Subsequently, the program returns to the original state without any particular step to be executed.

On the other hand, when judder occurs, the ECU 84 determines at the step 350 that the automatic transmission is in the operative range that the half-lock-up control for the lock-up clutch is inhibited. Then, the program goes to a step 360 at which the ECU 84 determines whether the vehicle speed V is higher than a predetermined value V1 or not. When the vehicle speed V is higher than V1, the program goes to a step 380 at which a command indicating a fifth forward speed stage is outputted to the ECU 84 so as to improve fuel economy.

Figure 8A:
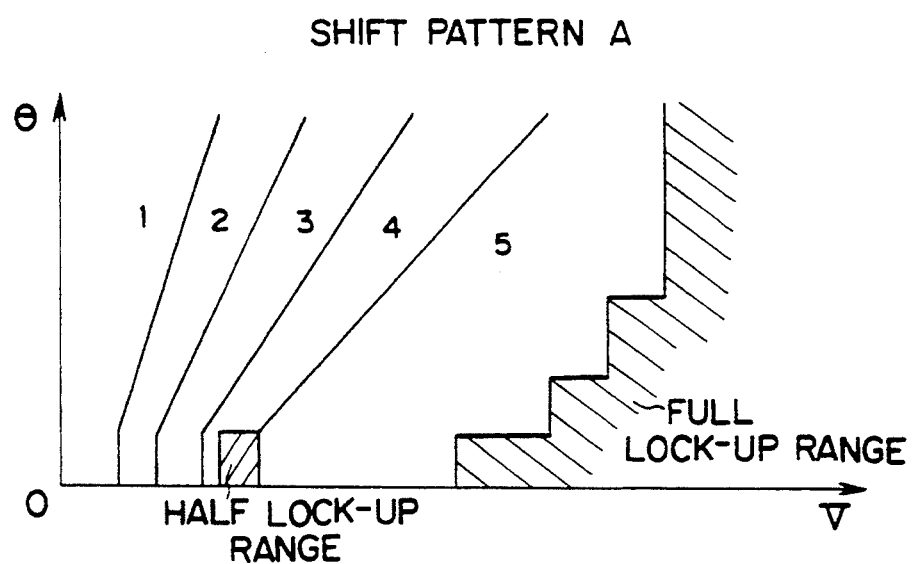
FIG. 8 is diagrams each showing an example of a shift pattern to be selectively set by the shift control system of the present invention.
Figure 8B:
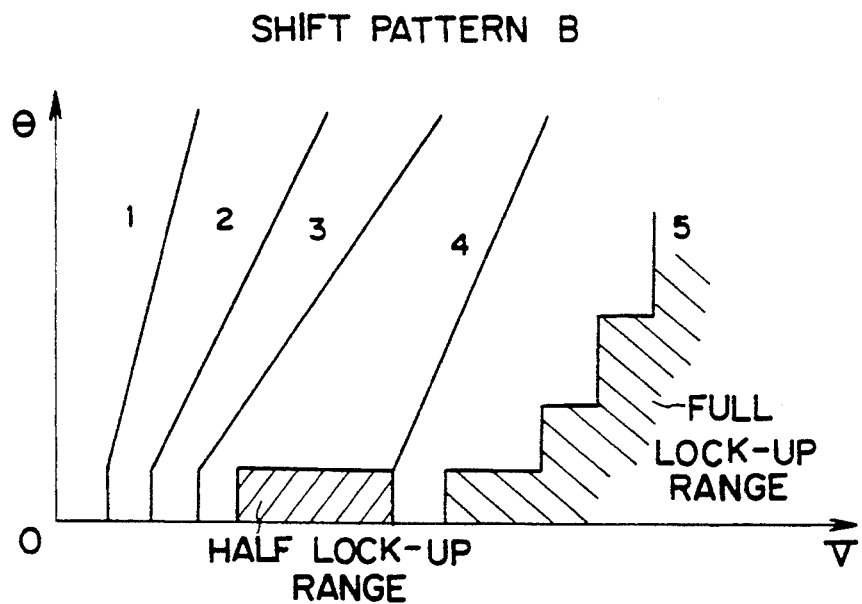

It should be noted that the predetermined value V1 represents a value which varies dependent on the throttle angle $\theta$ along the shift line extending midway between the fourth forward speed stage and the fifth forward speed stage as seen on the shift pattern A shown in FIG. 8.

According to the second embodiment of the present invention, the shift pattern B is not required to especially vary but the shift pattern B is substantially changed to the shift pattern A by performing the steps 350, 360 and 380.

As is apparent from the above description, the shift control system of the present invention is constructed based on the fact that each vehicle assumes an operative range that fuel economy can be improved in case that half-lock-up control for the lock-up clutch is executed at a lower speed stage much more than case that half-lock-up control for the lock-up clutch is not executed at a higher speed stage. Thus, a speed stage of the automatic transmission is controlled in consideration of the foregoing operative range in such a manner as to positively utilize the aforementioned operative range as far as possible. As a result, the shift control system of the present invention offers an advantageous effect that fuel economy can be improved in proportion to the positive utilization of the aforementioned operative range.

What is claimed is:

1. A shift control system for an automatic transmission of a vehicle, the transmission including a lock-up clutch, comprising:

means for storing at least two different shift patterns for shifting the transmission as a function of vehicle conditions including vehicle speed, one of the patterns setting a higher speed stage having a lower gear ratio for the transmission and another of the patterns setting a lower speed stage having a higher gear ratio for the transmission;

means for determining whether a half-lock-up control of the lock-up clutch is to be inhibited; and means for selecting either of said shift patterns as a shift pattern for controlling the transmission as a function of an output of said determining means, such that only said one of said shift patterns is selected when the half-lock-up control is inhibited.

2. The shift control system according to claim 1 wherein said determining means includes an oil temperature sensor for detecting a temperature of an oil in said automatic transmission.

3. The shift control system according to claim 1 wherein the determining means includes a means for selecting the shift pattern setting a high speed stage having a low gear ratio when the half-lock-up control is inhibited.

4. A shift control method for an automatic transmission of a vehicle, the transmission including a lock-up clutch, comprising the steps of:

storing at least two different shift patterns for shifting the transmission as a function of vehicle conditions including vehicle speed, one of the patterns setting a higher speed stage having a lower gear ratio for the transmission and another of the patterns setting a lower speed stage having a higher gear ratio for the transmission;

determining whether a half-lock-up control of the lockup clutch is to be inhibited; and selecting either of said shift patterns as a shift pattern for controlling the transmission as a function of an output of said determining means, such that only said one of said shift patterns is selected when the half-lock-up control is inhibited.

5. The shift control method according to claim 4 wherein said determining step comprises a step of detecting a temperature of an oil in said automatic transmission.

* * * * *